Patented May 2, 1939

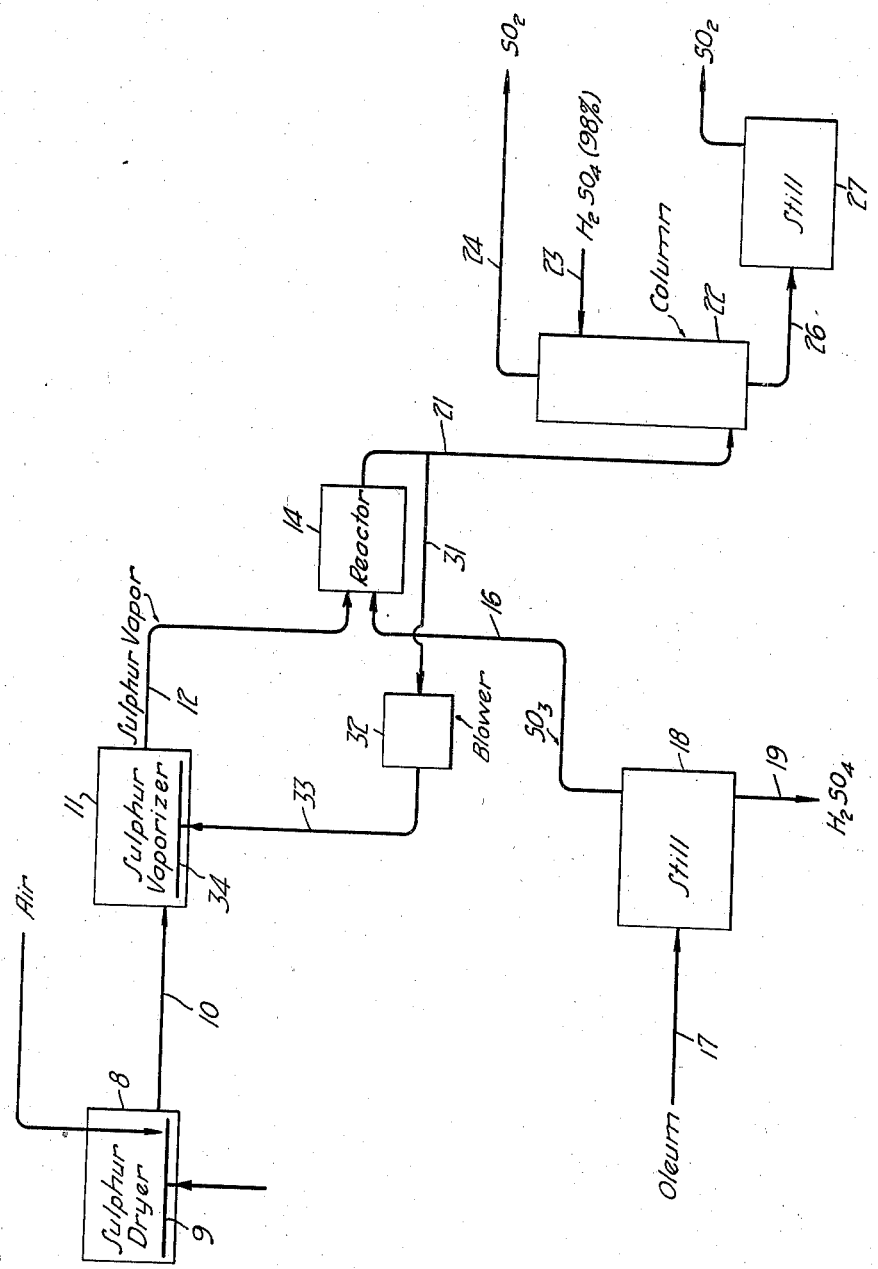

2,156,791

UNITED STATES PATENT OFFICE 2,156,791

PROCESS FOR PRODUCTION OF SULPHUR DIOXIDE

Albert C. Mohr, Berkeley, Calif., assignor to Stauffer Chemical Company, a corporation of California Application July 6, 1937, Serial No. 152,082

2 Claims. (Cl. 23—177)

This invention relates to the production of sulphur dioxide. This material has an extensive commercial use. In the presence of moisture it combines to form sulphurous acid which is corrosive to many materials. Consequently, in the use of sulphur dioxide it is a requisite that the sulphur dioxide be dry so that thereafter it can be used successfully in this state and corrosion avoided. The dryness required is of the order of less than fifty parts of water per million and commercial sulphur dioxide is commonly supplied to the trade at less than twenty parts per million.

The present manufacturing operations for the production of anhydrous sulphur dioxide include rectification which removes the water from the sulphur dioxide by fractional distillation. The sulphur dioxide is produced by the direct combustion of sulphur with substantially anhydrous air. I have found that it is not necessary to utilize this process and that sulphur dioxide can be produced directly from sulphur utilizing sulphur trioxide as the oxidizing agent. By utilizing sulphur trioxide, drying of the air is unnecessary. Since it is relatively difficult to get the air absolutely dry, this use of sulphur trioxide avoids possible contamination of the final product.

It is generally the broad object of this invention to provide a novel process for the production of sulphur dioxide.

Another object of the invention is to provide a process for the direct production of substantially pure anhydrous sulphur dioxide.

The process will become further apparent upon considering the following, wherein the present preferred manner of practicing the process of the present invention is disclosed. The drawing is a diagrammatic illustration of the manner of practicing the invention.

I find that if sulphur is first melted in a vessel 8 heated as by steam coil 9 to above its melting point, and if substantially dry air is then blown through the sulphur, the molten sulphur, when passed through the sulphur vaporizer 11, will provide substantially dry, water-free sulphur vapor. It has heretofore been proposed to maintain the sulphur at its melting point for a considerable length of time. However, it has been determined that this is not sufficient to drive off the moisture present in the sulphur, sufficient moisture being retained by the molten sulphur to make the $SO_2$ so wet that rectification of the $SO_2$ is a requisite.

From the sulphur vaporizer 11 vaporized sulphur maintained at a temperature above that at which sulphur begins to condense, is passed into a reactor 14. In this reactor the vaporized sulphur is reacted with sulphur trioxide supplied through line 16: $S+SO_3 \rightarrow 2SO_2$.

The sulphur trioxide is conveniently generated by heating oleum, or fuming sulphuric acid containing excess sulphur trioxide (100–110% $H_2SO_4$). The gases, sulphur and sulphur trioxide, are passed through the reactor wherein they are suitably contacted, the reactor being maintained at a pressure above the dew point of sulphur from the gases. The oleum can be supplied through line 17 into a still 18. In this still, sulphur trioxide is boiled off into line 16, while the $H_2SO_4$ is conveniently removed through line 19. Any other source of $SO_3$ can be used as the output of a contact sulphuric acid plant, the $SO_3$ being taken off before the absorber.

Line 21 conveys the sulphur dioxide away from the reactor. Depending upon the use to which it is to be put, it may or may not be scrubbed with a dilute sulphuric acid (98%) to remove any traces of $SO_3$. The dry, pure $SO_2$ is removed from column 22 in which it is scrubbed with sulphuric acid supplied from line 23. The sulphur dioxide, in pure dry form, is removed from the top of the column through line 24, while the acid is removed at the base of the column through line 26. The sulphuric acid in column 22 can be removed to a still 27 to distill off the $SO_2$.

It is not entirely practical to operate the process with the stoichiometric volumes indicated and I therefore prefer to operate with a slight excess of sulphur trioxide. This excess can vary up to 20%. The use of this excess has the advantage of removing any water present as sulphuric acid. Since the gases are subsequently scrubbed with acid in which $SO_3$ dissolves, practically dry pure $SO_2$ is readily available on a commercial basis.

The reaction of sulphur vapor and sulphur trioxide is exothermic and the gas in line 21 will therefore be quite hot. This heat can be used advantageously by diverting the hot gas containing an excess of trioxide, through line 31 into blower 32. This device discharges into line 33 connected to distribution plate 34 in the sulphur vaporizer. The hot gas vaporizes sulphur when the sulphur in vaporizer 11 is above its melting point. This vapor reacts with the $SO_3$ in the vaporizer to vaporize more sulphur. The mixture of $SO_2$ and sulphur vapor passes on the reactor wherein excess $SO_3$ is added to free the gas of the sulphur vapor and form $SO_2$.

I claim:

1. A process of forming substantially dry pure $SO_2$ which comprises reacting sulphur vapor, at a temperature above the boiling point of sulphur, with gaseous undiluted sulphur trioxide, with heat supplied by said reaction, to form a gaseous mixture of $SO_2$ and $SO_3$ and removing $SO_3$ from the mixture.

2. A process for production of $SO_2$ comprising vaporizing S with hot $SO_3$ gas to oxidize the S to $SO_2$ and form sulphur vapor and then oxidizing the so formed sulphur vapor with $SO_3$ gas to form a hot gas mixture of $SO_2$ and $SO_3$ and returning at least a portion of the hot gas mixture as the hot $SO_3$ gas to vaporize S.

ALBERT C. MOHR.